Oct. 2, 1962 W. L. HACK 3,056,195
METHOD OF BRAZING
Filed Jan. 4, 1959
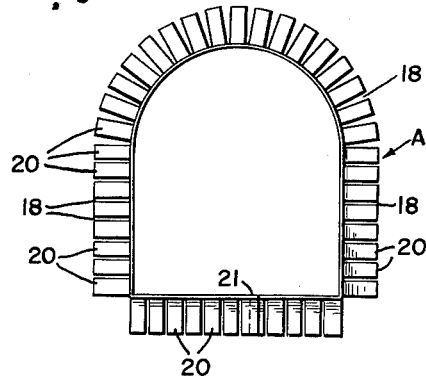
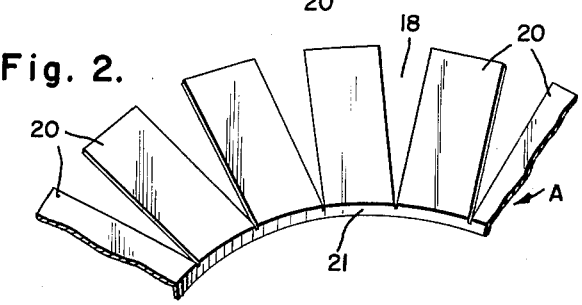
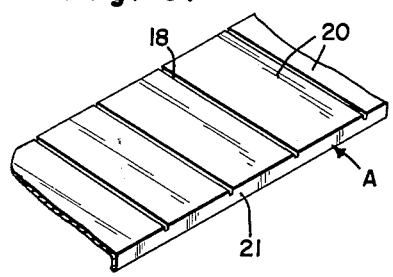
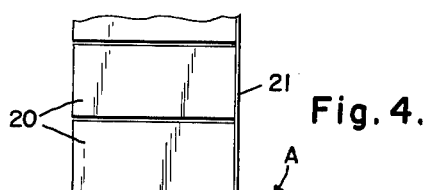
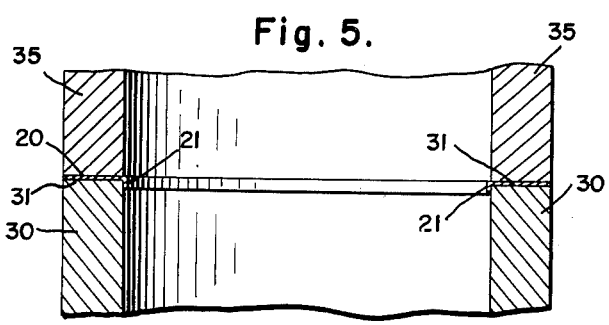
INVENTOR.
Walter L. Hack
BY
Townsend and Townsend
attorneys United States Patent Office 3,056,195
Patented Oct. 2, 1962

3,056,195
METHOD OF BRAZING
Walter L. Hack, San Carlos, Calif., assignor to Western Gold and Platinum Company, Belmont, Calif., a corporation of California
Filed June 4, 1959, Ser. No. 818,152
2 Claims. (Cl. 29—475)

This invention relates to the formation of a flexible brazing alloy stamping.

More particularly this invention relates to a method of and means for positioning brazing alloy between two bodies which are to be brazed together in such a way that when the bodies are heated the brazing alloy will provide a satisfactory brazed joint joining the two bodies together.

Previously two common methods have been commercially employed in brazing bodies together one of which include the provision of a wire formed of brazing alloy around the point of joinder of the two bodies as in a specially formed notch so that when the brazing alloy is melted it will meter into the joint by capillary action to provide a coating of brazing alloy between the two bodies. In this method the flow of brazing alloy is often so restricted that an imperfect braze results. The other common method of brazing two bodies together is to place a stamping formed of a brazing alloy at the joint between the two bodies. Such stampings are preformed in shape to correspond to the shape of abutting edges of the bodies and are placed between the bodies in position to melt and braze the bodies together. Thus, for example, when the edges of two cylindrical bodies are brazed together an annular stamping of diameter equal to the cylindrical bodies is placed between the two abutting edges of the bodies. Such a stamping insures complete covering of the brazing alloy to form a satisfactory brazing joint. The stamping, however, must be preformed to conform to the shape of the objects to be brazed. Therefore, if a great variety of shapes and sizes are to be brazed it is necessary to maintain an inventory of the stamping suitable for each of the shapes and sizes. The cost of stamping is high due to scrap waste of the brazing alloy resulting from the stamping process. This is important in that the brazing alloys are formed of relatively expensive metals in some cases comprising gold, silver and platinum.

The principal object of this invention is to provide a device which may be used in a manner similar to stampings which has sufficient flexibility to allow the device to conform to the shape of a great variety of joints to be brazed.

A feature and advantage of this invention is that there is a minimum of scrap waste resulting from the stamping of the device and the need for an inventory of special shaped stampings is eliminated.

Another object of this invention is to provide a device formed of a brazing alloy in a shape having an edged strip which provides means for jigging the device in place relative to the joint to be brazed.

Still another object of this invention is to form a brazing alloy in an integral elongated strip having a plurality of flat ears projecting outwardly from one edge of the strip at substantially right angles thereto.

A feature and advantage of this invention is that the strip can be bent to prescribe virtually any configuration with the ears being arranged to provide a flat surface area of brazing alloy which may be positioned to form the joint to be brazed between two objects.

A further object of this invention is to provide a method of forming a brazing preform stamping including the steps of forming an elongated strip of a brazing alloy, creating a plurality of serrations of equal depth along the strip and bending the serrated portion of the strip at substantially right angles relative to the non-serrated portion of the strip.

Still a further object of this invention is to provide a method of welding two bodies together in which an elongated strip of welding alloy is serrated and bent so that the non-serrated portions are at right angles to the serrated portion and thereafter the serrated portion of the strip is positioned on the surface of the joint to be welded with the non-serrated portion of the strip bent around the wall of one of the two objects adjacent the joint.

Another feature and advantage of this invention is that the novel brazing strip may be used in multiple layers so that the ears of one layer are positioned over the spaces between ears of the other layer; by this device double thickness of brazing alloy is deposited and all the area to be brazed is directly covered by the brazing alloy.

Other objects of the present invention will become apparent upon reading the following specification and referring to the accompanying drawings in which similar characters of reference represent corresponding parts in each of the several views.

In the drawings:

FIG. 1 is a top plan view of a principal embodiment of the invention showing the device shaped to correspond to the edge of the object to be brazed.

FIG. 2 is an enlarged fragmentary perspective of the device of FIG. 1 showing the device arranged in a circular path.

FIG. 3 is a view similar to FIG. 2 showing the device in a straight line.

FIG. 4 is a similar view of FIGS. 3 and 2 showing the device formed in a right angle bend.

FIG. 5 is a cross-sectional view of two objects to be brazed showing the device positioned in the space between the two adjoining edges of the objects to be brazed.

The stamping or preform device of this invention is arranged to fit between two abutting surfaces to be brazed. The device comprises a strip of material generally indicated at A. The material is formed of a suitable brazing alloy which may comprise gold, copper, bronze, cobalt, nickel, silver, platinum, lead or any of the other metals which are conventionally used for brazing purposes. The particular metals selected will depend upon the use for which the device is to be put.

The strip is provided with a series of slots 18 of equal depth which form a plurality of separations to form ears 20 integrally connected to a continuous strip 21. The slotted portion of the strip may be viewed as the serrated portion of the strip and the portion of the length below the cuts may be viewed as the non-serrated portion of the strip. The non-serrated portion or length 21 is bent at right angles relative to the serrated portions or ears 20 and the ears themselves are arranged in substantially coplanar relationship to each other. The thickness of the metal forming strip A may be any suitable thickness used for welding purposes. Usually such devices are in the range of .001 to .005 inch thick; however, these dimensions may be more or less depending upon the brazing requirements.

In operation to employ the device the strips are mounted on an object to be brazed by placing non-serrated length 21 against the inside of wall 30 of one of the objects to be brazed with the length depending from the top edge 31 of wall 30, so that serrated portion or ears 20 rest on top of edge 31. Such relationship can be seen in FIG. 5. The ears thus fill the substantial portion of the area of edge 31 in much the same manner that a conventional preform or stamping would fill the area.

Thereafter the other object to be brazed indicated at 35 is mounted over the top of ears 20 and in alignment there-with. The device is then put into an oven wherein sufficient temperature is generated to cause the brazing alloy to melt. Capillary action and metal flow characteristics of the metal will cause the molten metal to fill in the area of slots 18 to provide a complete coating of the brazing alloy between the two bodies 30 and 35. It can thus be seen that the new and improved welding preform device may be mounted around a curve as indicated in FIG. 2, may be mounted around a straight line as indicated in FIG. 3 and may be formed in a right angle bend as indicated in FIG. 4. The depending strip 21 abutting against the inside wall 30 provides a self jigging feature which will align the respective ears 20 precisely over the edge to be joined. If the ears are longer than the width of the edge to be joined they may be cut off by suitable shears.

It is believed obvious that the strips can be used in multiple layers and when used in this manner the ears of the two layers can be staggered so that the space between ears in each layer is covered by an ear of the other layer.

Although the foregoing invention has been described in some detail by way of illustration and example for purposes of clarity of understanding, it is understood that certain changes and modifications may be practiced within the spirit of the invention as limited only by the scope of the appended claims.

What is claimed:

1. A method of brazing two similar irregularly contoured surfaces together having the steps of forming a serrated brazing alloy strip by cutting a plurality of uniformly spaced slots through substantially the width of a flat strip of brazing alloy to provide a plurality of fingers connected to a narrow continuous web on one edge of the strip, bending the web into a plane at right angles to the fingers, applying the strip to the irregularly contoured surface by bending the web at right angles relative to its plane to conform the strip to the contour of the surface and to position the fingers between the members to be joined and the web against the wall of one of the members to locate said strip, and heating said surfaces and strip to the melting point to form a brazed joint.

2. A method of brazing according to claim 1 and wherein a second serrated brazing alloy strip is formed in similar configuration to the first strip, then applying the second strip to the surface and bending the web at right angles relative to its plane to conform the strip to the contour of the joint and positioning the fingers over the fingers of the first strip and over the area between the fingers of the first strip prior to heating.

References Cited in the file of this patent

UNITED STATES PATENTS

| | | |
|---|---|---|
| 364,663 | Norton | June 14, 1887 |
| 432,691 | Burdon | July 22, 1890 |
| 1,754,466 | Hosking | Apr. 15, 1930 |
| 1,784,142 | Hosking | Dec. 9, 1930 |
| 1,823,028 | Caldwell | Sept. 15, 1931 |
| 2,061,588 | Peschel | Nov. 24, 1936 |
| 2,119,999 | Naeder | June 7, 1938 |
| 2,251,074 | Sibley | July 29, 1941 |
| 2,341,752 | West | Feb. 15, 1944 |
| 2,569,058 | Hobbs | Sept. 25, 1951 |
| 2,761,202 | Beare | Sept. 4, 1956 |
| 2,926,421 | Sandberg | Mar. 1, 1960 |
| 2,958,941 | Goerg | Nov. 8, 1960 |
| 3,002,481 | Hutters | Oct. 3, 1961 |

FOREIGN PATENTS

| | | |
|---|---|---|
| 503,556 | Belgium | June 15, 1951 |
| 359,813 | Germany | Sept. 26, 1922 |
| 24,932 | Great Britain | 1908 |
| 717,038 | Great Britain | Oct. 20, 1954 |